US010153978B1

(12) United States Patent
di Proietto et al.

(10) Patent No.: US 10,153,978 B1
(45) Date of Patent: Dec. 11, 2018

(54) DISTRIBUTED ANTICIPATORY BIDIRECTIONAL PACKET STEERING FOR SOFTWARE NETWORK FUNCTIONS

(71) Applicant: Nefeli Networks, Inc., Berkeley, CA (US)

(72) Inventors: Daniele di Proietto, San Francisco, CA (US); Barath Raghavan, El Cerrito, CA (US); Sylvia Ratnasamy, Berkeley, CA (US); Justine Sherry, Pittsburgh, PA (US); Melvin Walls, Berkeley, CA (US)

(73) Assignee: Nefeli Networks, Inc., Berkeley, CA (US)

( * ) Notice: Subject to any disclaimer, the term of this patent is extended or adjusted under 35 U.S.C. 154(b) by 0 days.

(21) Appl. No.: 15/972,015

(22) Filed: May 4, 2018

(51) Int. Cl.
| | |
|---|---|
| *H04L 12/725* | (2013.01) |
| *H04L 12/851* | (2013.01) |
| *H04L 12/813* | (2013.01) |
| *H04L 12/803* | (2013.01) |
| *H04L 12/755* | (2013.01) |
| *H04L 12/721* | (2013.01) |

(52) U.S. Cl.
CPC ........ *H04L 47/2441* (2013.01); *H04L 45/021* (2013.01); *H04L 47/125* (2013.01); *H04L 47/20* (2013.01); *H04L 45/38* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,991,893 A | * | 11/1999 | Snider ...................... | G06F 9/52 712/E9.001 |
| 6,460,055 B1 | * | 10/2002 | Midgley ............. | G06F 11/1461 707/640 |
| 6,526,418 B1 | * | 2/2003 | Midgley ............. | G06F 11/1451 707/640 |

(Continued)

OTHER PUBLICATIONS

Eisenbud, et al., "Maglev: A Fasat and REliable Software Network Load Balancer," Google Inc, 13th USENIX Symposium on Networked Systems Design and Implementation (NSDI 16), USENIX Association, Santa Clara, CA (2016), pp. 1-13.

(Continued)

*Primary Examiner* — Jay P Patel
(74) *Attorney, Agent, or Firm* — The Mueller Law Office, P.C.

(57) ABSTRACT

A method for anticipatory bidirectional packet steering involves receiving, by a first packet steering module of a network, a first encapsulated packet traveling in a forward traffic direction. The first encapsulated packet includes a first encapsulating data structure. The network includes two or more packet steering modules and two or more network nodes. Each of the packet steering modules includes a packet classifier module, a return path learning module, a flow policy table, and a replicated data structure (RDS). The return path learning module of the first packet steering module generates return traffic path information associated with the first encapsulated packet and based on the first encapsulating data structure. The first packet steering module updates the RDS using the return traffic path information and transmits the return traffic path information to one or more other packet steering modules.

24 Claims, 13 Drawing Sheets

(56) References Cited

U.S. PATENT DOCUMENTS

| | | | |
|---|---|---|---|
| 6,625,623 B1* | 9/2003 | Midgley | G06F 11/1451 |
| | | | 707/640 |
| 6,779,003 B1* | 8/2004 | Midgley | G06F 11/2071 |
| 6,847,984 B1* | 1/2005 | Midgley | G06F 11/1466 |
| 7,051,032 B2* | 5/2006 | Chu-Carroll | G06F 17/2247 |
| 7,466,697 B1* | 12/2008 | Raz | H04L 45/00 |
| | | | 370/389 |
| 7,739,403 B1* | 6/2010 | Balakrishna | H04L 12/66 |
| | | | 709/225 |
| 8,042,000 B2* | 10/2011 | Birch | G06F 11/2215 |
| | | | 714/11 |
| 9,568,943 B1* | 2/2017 | Carman | G06F 11/1446 |
| 9,729,439 B2* | 8/2017 | MeLampy | H04L 45/38 |
| 9,832,068 B2* | 11/2017 | McSherry | G06F 17/30539 |
| 9,985,872 B2* | 5/2018 | Jaffer | H04L 45/021 |
| 2003/0212686 A1* | 11/2003 | Chu-Carroll | G06F 17/2247 |
| 2010/0106744 A1* | 4/2010 | Wang | G06F 17/30206 |
| | | | 707/783 |
| 2010/0246593 A1* | 9/2010 | Belanger | H04L 47/2483 |
| | | | 370/419 |
| 2010/0268991 A1* | 10/2010 | Birch | G06F 11/2215 |
| | | | 714/32 |
| 2010/0290475 A1* | 11/2010 | Belanger | H04L 49/355 |
| | | | 370/401 |
| 2010/0303083 A1* | 12/2010 | Belanger | H04L 49/602 |
| | | | 370/401 |
| 2010/0316055 A1* | 12/2010 | Belanger | H04L 49/15 |
| | | | 370/396 |
| 2011/0090912 A1* | 4/2011 | Shippy | H04L 67/1002 |
| | | | 370/400 |
| 2014/0156598 A1* | 6/2014 | Chandra | G06F 17/30575 |
| | | | 707/634 |
| 2014/0334488 A1 | 11/2014 | Guichard et al. | |
| 2014/0379645 A1* | 12/2014 | Wickremesinghe | G06F 11/203 |
| | | | 707/624 |
| 2015/0003455 A1* | 1/2015 | Haddad | H04L 45/38 |
| | | | 370/392 |
| 2015/0124815 A1 | 5/2015 | Beliveau et al. | |
| 2016/0119226 A1* | 4/2016 | Guichard | H04L 45/00 |
| | | | 370/392 |
| 2016/0139939 A1 | 5/2016 | Bosch et al. | |
| 2016/0182684 A1* | 6/2016 | Connor | G06F 9/45558 |
| | | | 709/203 |

OTHER PUBLICATIONS

Palkar et al., "E2: A Framework for NFV Applications," SOSP Oct. 2015 Proceedings of the 25th Symposium on Operating Systems Principles, pp. 121-136.

* cited by examiner

DISTRIBUTED ANTICIPATORY BIDIRECTIONAL PACKET STEERING FOR SOFTWARE NETWORK FUNCTIONS

BACKGROUND

Software network functions (NFs) are software applications that process packets in a network traffic stream. Examples of such NFs include network intrusion detection systems (IDS), protocol or WAN optimizers, firewalls, Network Address Translators (NATs), and so forth.

In some instances, network traffic is partitioned across multiple instances of a single NF. Running multiple instances of an NF is sometimes necessary when a total incoming traffic load exceeds the processing capability of a single NF instance. In such scenarios, a mechanism is often used to partition or "load balance" incoming traffic across the NF instances. Such load-balancing is often used in network configurations where network traffic is processed by a single NF, or by a sequence of NFs (the latter is commonly referred to as a "chain," or "network service function chain" of NFs).

Typically, such load-balancing should preserve "correctness" of network traffic. That is, each incoming packet should typically be directed to the particular NF instance that holds state needed to process that packet. In some scenarios, correctness should be maintained even as the number of NF instances varies dynamically and for NFs that modify a packet's headers and/or payload.

The problem of partitioning an incoming traffic stream across multiple instances of an NF arises in the context of many scalable software services; e.g., web services. A typical approach in many such contexts is to insert a standalone load-balancer on the path between incoming traffic and the NFs. This load-balancer may be implemented as a standalone appliance, a standalone software virtual machine or container, or a standalone software service. Approaches based on a standalone load-balancer may be well suited to software services that act at the application layer such as web services, storage services, etc. However, these approaches often fail to meet goals such as correctness, scalability, efficiency, low performance overhead, and automation within an NF context. This is because NFs are typically deployed as a "bump in the wire" between two communicating endpoints and/or may modify packet headers and/or payloads of network traffic traversing the NFs.

SUMMARY

In some embodiments, a method for distributed anticipatory bidirectional packet steering involves receiving, by a first packet steering module of a network, a first encapsulated packet traveling in a forward traffic direction. The first encapsulated packet includes a first encapsulating data structure, and the network includes two or more packet steering modules and two or more network nodes. The first packet steering module is one of the two or more packet steering modules. Each of the packet steering modules includes a packet classifier module, a return path learning module, a flow policy table, and a replicated data structure (RDS). The return path learning module of the first packet steering module generates return traffic path information associated with the first encapsulated packet and based on the first encapsulating data structure. The first packet steering module updates the RDS at the first packet steering module using the return traffic path information and transmits the return traffic path information to one or more other packet steering modules of the two or more packet steering modules.

In some embodiments, a method for distributed anticipatory bidirectional packet steering involves receiving, by a first packet steering module at a first compute node of a network, a first encapsulated packet of a first network packet flow. The first encapsulated packet is received from a first network function at the first compute node. The first encapsulated packet is traveling in a forward network traffic direction from the first network function. The first packet steering module generates return traffic path information associated with the first encapsulated packet. The return traffic path information includes one or more indicators which indicate one or more network functions of the network. The first packet steering module transmits the return traffic path information peer-to-peer to a second packet steering module of a second compute node of the network. The second compute node includes a plurality of network functions. The second packet steering module is configured to forward packets of a second network flow to a second network function at the second compute node and is configured to not forward any packets of the first network packet flow to the second network function.

DETAILED DESCRIPTION

Figure 1:
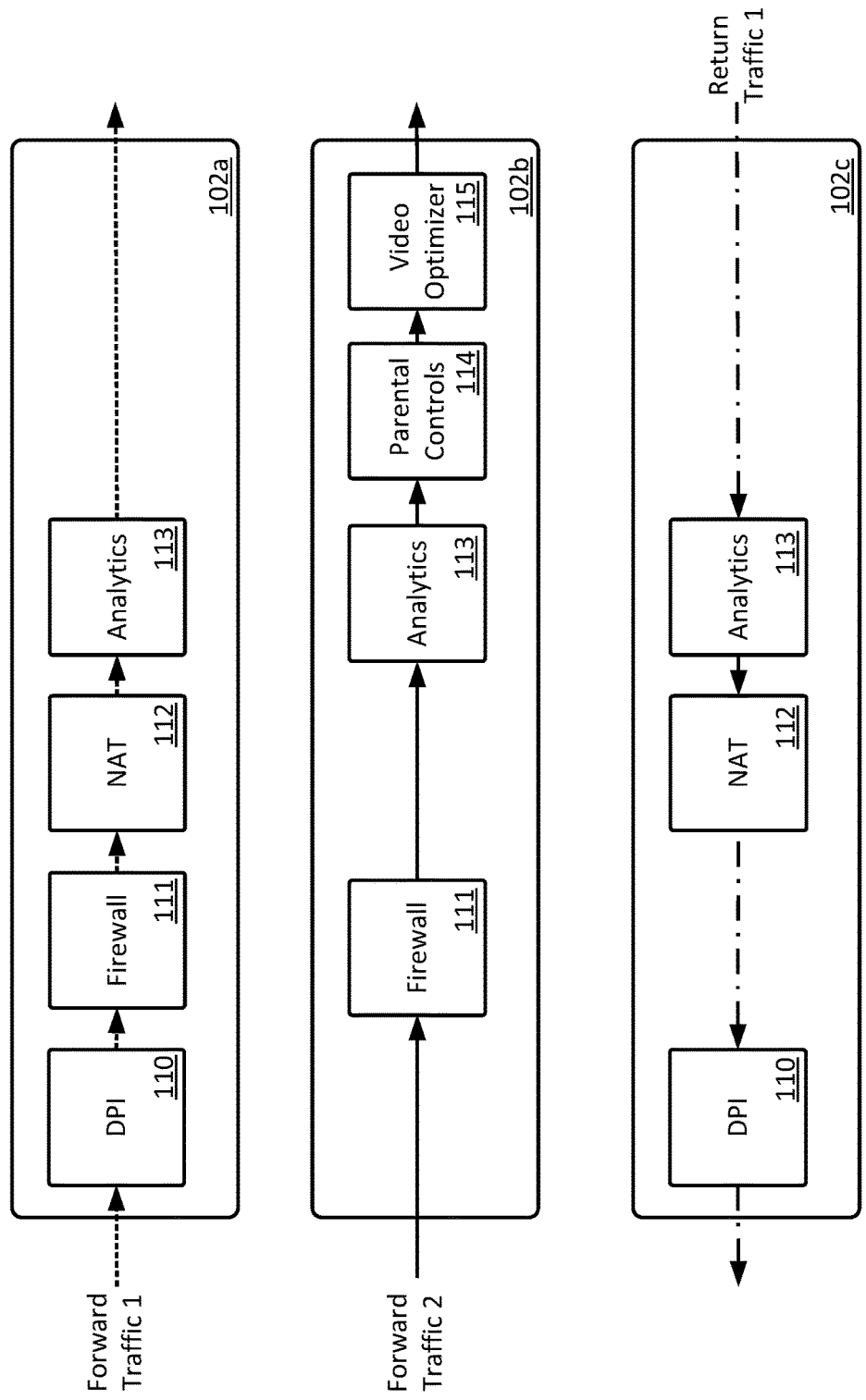
FIG. 1 illustrates example logical network service function chains (SFCs) of a network, in accordance with some embodiments.

Embodiments of systems and methods for distributed bidirectional anticipatory packet steering are described herein. These systems and methods involve a distributed anticipatory packet steering module (APSM) which is based on the synthesis of three key design ideas: distribution, integration, and learning. These ideas work in concert to provide a distributed anticipatory bidirectional packet steering solution that is correct, automated, scalable and efficient.

The system ensures that the packet steering is correct and automated by using learning algorithms at modules of each APSM. Such systems and methods ensure that load-balancing between network functions (NFs) (also referred to herein as service nodes) is correct without requiring any manual configuration by an operator. The system is scalable due to the distributed nature of such software/firmware modules. The distributed nature of the modules ensures that load-balancing of a network capacity scales in proportion with the capacity of the NFs provisioned within that network. The integrated nature of such systems and methods ensures that load-balancing and packet steering consumes minimal resources and adds minimal overhead to the end-to-end per-packet processing latency of the network.

Systems and methods advantageously include integration, distribution, and learning, each of which is discussed at a high level below.

Packet classification, packet steering, and load-balancing logic are integrated closely (e.g., on the same compute node) with instances of the network functions. This integration contrasts with a typical standalone approach to load-balancing which may include load-balancer(s) that are deployed, provisioned, and configured at separate entities than the NFs. Close integration between the NFs and packet classification, packet steering and/or load balancing logic ensures efficient use of resources (CPU and bandwidth), ensures efficient communication between the load-balancing logic and the NFs (thus introducing minimal overhead), and enables the learning capabilities described below (hence enabling correctness and automation).

Packet classification, packet steering, and load-balancing logic are implemented as a set of distributed entities (APSMs), each integrated closely with the NFs. Since the implementation is distributed, the set of packet classification, packet steering, and load-balancing logic entities (APSMs) collectively act as a logically centralized packet classification, packet steering, and load-balancing module. That is, incoming traffic can be directed to any one of the APSMs, and any APSM entity can correctly direct the traffic it receives to the appropriate NF instance. Hence, for a given set of active NFs, packet classification/packet steering/load-balancing takes place with no centralized coordination or control. This distributed architecture ensures scalability and robustness under failure.

As mentioned above, for correct behavior, a load-balancer or packet steering module must direct a packet to the NF instance that holds the state required to process that packet. For example, in the case of an NF that implements NAT processing, a packet must be directed to the NAT instance that holds the address translation record for the flow that the packet belongs to. The context of load-balancing for NFs introduces two difficulties: (i) because NFs are typically deployed in a "bump in the wire" manner, the load-balancer is invoked on both the forward and return path of traffic, (ii) because NFs may modify packet headers, traffic in the forward and return direction may have entirely different headers and payloads, yet packets from both directions of a flow must be mapped to the same NF for correctness. To solve these challenges, each APSM advantageously performs a learning algorithm by which that APSM dynamically learns the correct mapping between packets and NF instances even in the face of NFs that modify packet headers and/or payloads. In addition, the learning algorithms also ensure zero-touch automation. That is, as new resources are added to the network deployment, load-balancing capacity scales proportionally, and each APSM automatically learns how it should correctly distribute incoming traffic across a given set of active NFs.

Examples of logical network service function chains (SFCs) 102a-c of a network 100 are illustrated in FIG. 1, in accordance with some embodiments. Each of the logical network service function chains 102a-c includes one or more network service functions (NFs) 110-115. The NFs 110-115 of the example logical network service function chains 102a-c forward, drop, inspect, modify, or perform other operations on bidirectional network traffic of the network 100. Examples of network service functions include deep packet inspection functions, firewalls, load balancers, NAT functions, WAN optimizers, video optimizers, parental controls, etc. Typically, such NFs are implemented as a "bump in the wire," or as a "middle box," of a network. That is, bidirectional network traffic of the network traverses through one or more NFs but does not necessarily originate or terminate at one of the NFs.

Different packet flows of a network may traverse different network service function chains of the network. A packet flow is considered to be two or more packets which are contextually or logically associated with each other. In the example shown in FIG. 1, a packet flow designated as Forward Traffic 1 of the network 100 traverses the logical network service function chain 102a, and a packet flow designated as Forward Traffic 2 traverses the logical network service function chain 102b. As shown, the logical network service function chain 102a includes a deep packet inspection (DPI) NF 110, a firewall NF 111, a network address translator (NAT) NF 112, and an analytics NF 113. The logical network service function chain 102b includes the firewall NF 111, the analytics NF 113, a parental control NF 114, and a video Optimizer NF 115.

In some instances, return network traffic associated with a packet flow traverses the same network service function chain that other packets of that packet flow traversed when traveling in a forward traffic direction. Return Traffic 1 of the network 100 includes packets associated with the flow of Forward Traffic 1, but which are traveling in a return traffic direction relative to Forward Traffic 1. As shown, Return Traffic 1 traverses the Analytics NF 113, the NAT NF 112, and the DPI NF 110 of the logical network service function chain 102c. In other instances, return network traffic of a packet flow traverses only a portion of the same network service function chain that corresponding forward network traffic traversed. In still yet other instances, return network traffic of a packet flow traverses an entirely different network service function chain.

In some situations, a particular instance of an NF maintains a state which is relevant to a flow of packets traversing that NF. Such NFs are considered to be "stateful." To maintain a correct network state, it is desirable for bidirectional traffic of a packet flow to traverse particular NF instances which maintains a state that is relevant to that packet flow. For example, if a DPI NF requires multiple packets of a flow to inspect higher level protocol content of that packet flow, packets of that flow may be required to traverse that particular instance of the DPI NF in both forward and return traffic directions.

Figure 2:
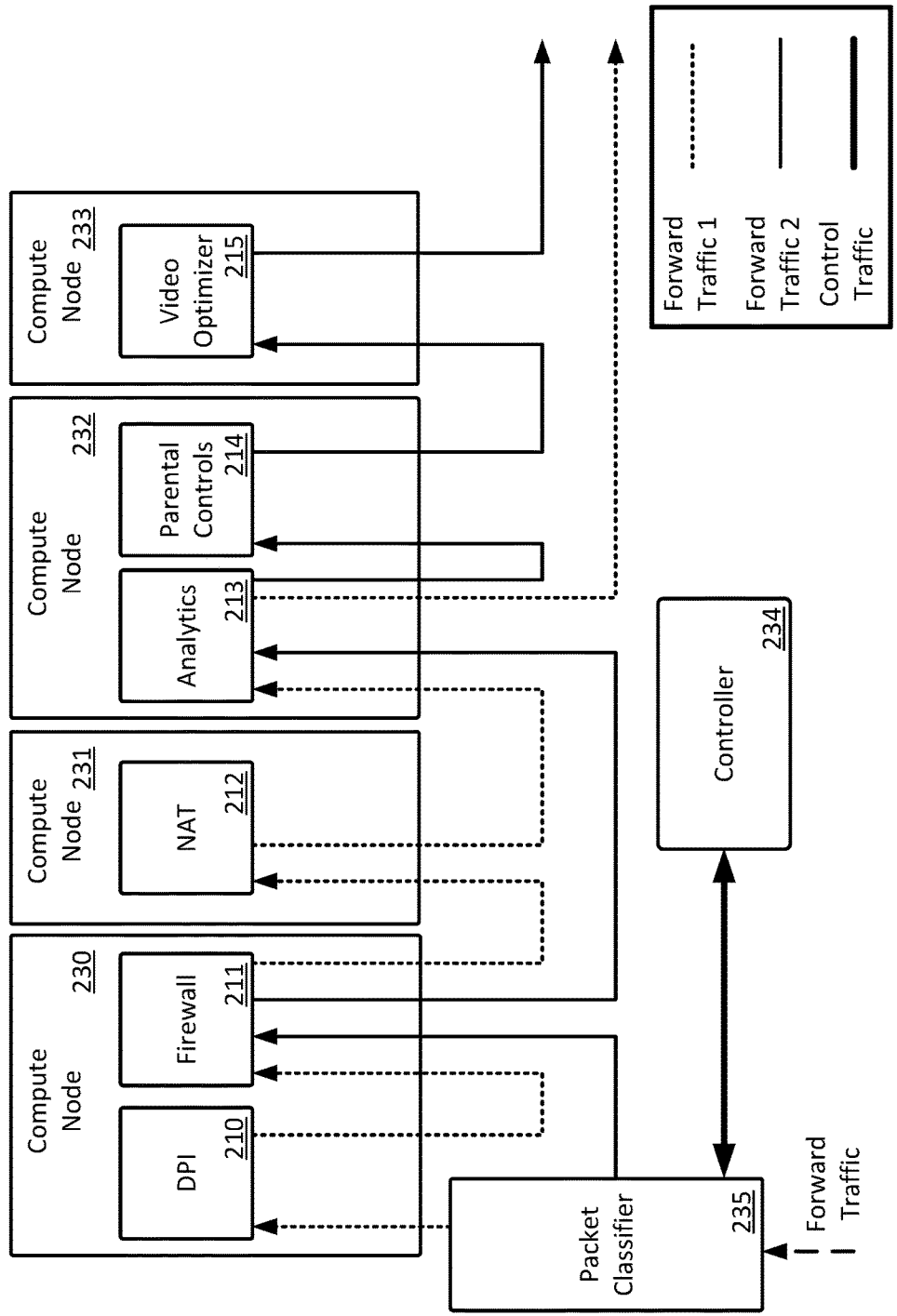
FIG. 2 illustrates network traffic traversing an example network service architecture of a network.

A centralized packet classifier module is sometimes used to perform the task of steering packets of a flow to particular instances of NFs within a network service function chain. A centralized module or controller is a module or controller that is not distributed across multiple compute nodes of a network. A distributed module or controller, on the other hand, is a module or controller that is distributed across multiple compute nodes of a network, the distributed instances of the module or controller working collaboratively to provide a particular service within the network. An example of a network 200 that includes a typical centralized packet classifier module 235 is shown in FIG. 2. The portion of the network 200 shown also includes compute nodes 230-233, and a centralized controller module 234. Network functions 210-215 are provisioned (e.g., installed and/or running as software, as dedicated hardware, or otherwise realized) across the compute nodes 230-233. That is, each of the NFs 210-215 is implemented as software/firmware running on one or more of the compute nodes 230-233 of the network 200, as dedicated hardware within one or more of the compute nodes 230-233, or as a combination of the two. Example implementations of compute nodes include shared or dedicated CPUs. These CPUs could be part of a network node that performs a single network function, performs multiple network functions, or performs other tasks in addition to performing network functions. Examples of dedicated hardware include ASICs and FPGAs.

As was illustrated in FIG. 1, different packet flows of network traffic may traverse different network service function chains of a network. In the example shown in FIG. 2, the centralized controller module 234 provides forward traffic path information associated with various flows of the network 200 to the centralized packet classifier module 235 using Control Traffic. The Control Traffic may be communicated using a control plane of the network 200 rather than a data plane. The centralized packet classifier module 235 typically stores received forward traffic path information in a local or distributed data structure (e.g., a hash table, or a distributed hash table).

Packets of Forward Traffic of the network 200 are received at the centralized packet classifier module 235. The Forward Traffic includes one or more packets associated with one or more packet flows. The centralized packet classifier module 235 uses forward traffic path information provided by the centralized controller module 234 to identify forward traffic path information associated with each received packet. The centralized packet classifier module 235 then forwards that packet to one or more of the NFs 210-215 according to the identified traffic path information. For example, upon receiving Forward Traffic packets, the centralized packet classifier module 235 identifies two flows of the network 200 that those packets shall traverse. The first flow of packets corresponds to Forward Traffic 1 and the second flow of packets corresponds to Forward Traffic 2.

Forward Traffic 1 traverses a series of NF instances which embody the logical network service function chain 102a shown in FIG. 1. Thus, Forward Traffic 1 traverses a DPI NF 210, a firewall NF 211, a NAT NF 212, and an analytics NF 213. Similarly, Forward Traffic 2 traverses a series of NF instances that embody the logical network service function chain 102b shown in FIG. 1. Thus, Forward Traffic 2 traverses the firewall NF 211, the analytics NF 213, a parental controls NF 214, and a video optimizer NF 215.

Figure 3:
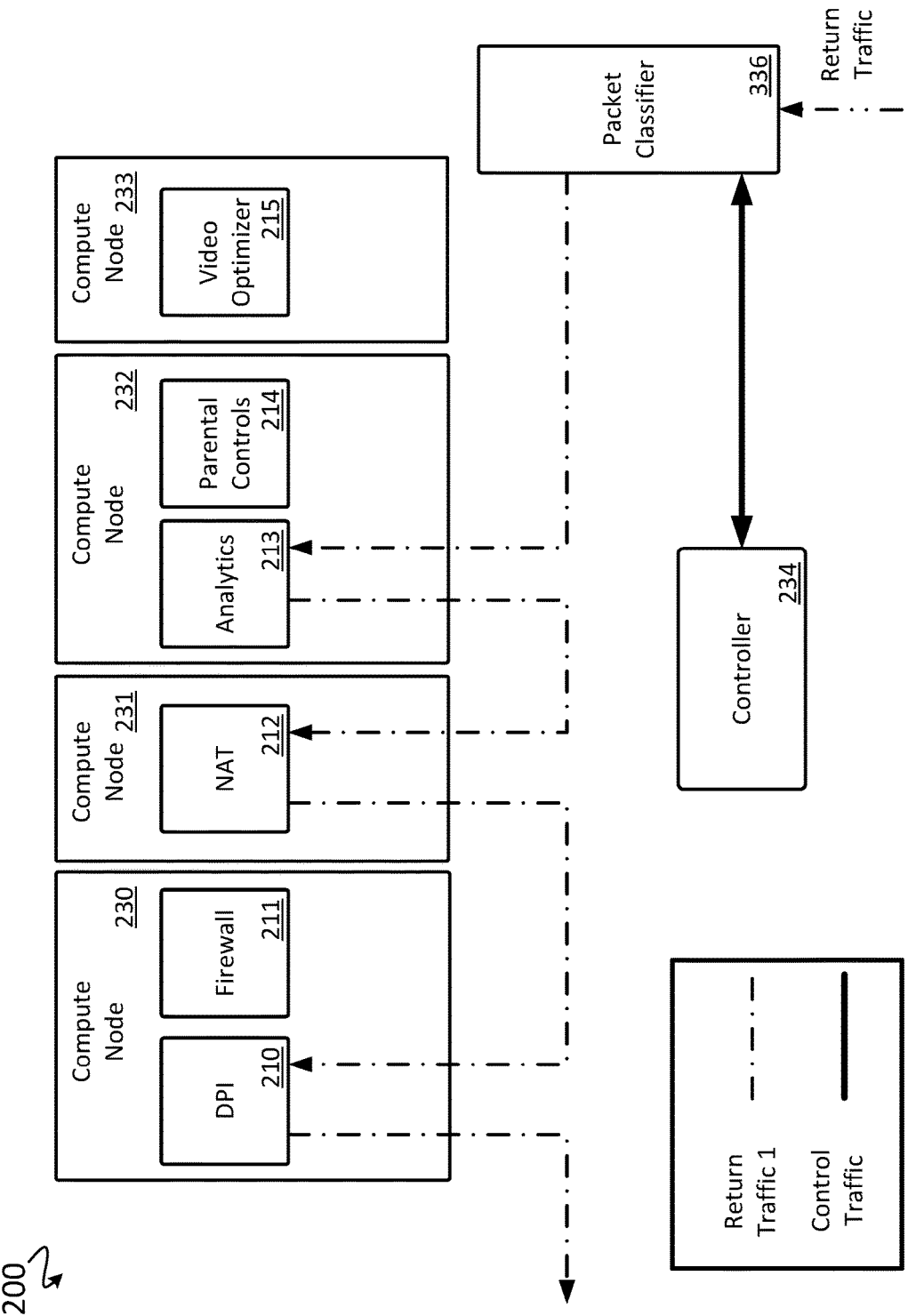
FIG. 3 illustrates network traffic traversing an example network service architecture of a network.

FIG. 3 illustrates packets of Return Traffic of the network 200 traversing the compute nodes 230-233 in a return network traffic direction. As shown, the network 200 includes another centralized packet classifier module 336 to steer packets traveling in the return traffic direction. In some typical implementations, the centralized packet classifier module 336 and the centralized packet classifier module 235 are each part of the same centralized packet classifier module In the example shown, packets of the Return Traffic of the network 200 are received by the centralized packet classifier module 336. In some instances, the centralized packet classifier module 336 uses return traffic path information provided by the centralized controller module 234 to identify return traffic path information associated with each received packet. The centralized packet classifier module 336 then forwards each packet to one or more of the NFs 210-215 according to the identified return traffic path information.

For example, upon receiving packets of the Return Traffic of the network 200, the centralized packet classifier module 336 identifies a flow of packets corresponding to a packet flow designated as Return Traffic 1. Packets of Return Traffic 1 traverses a series of NF instances that embody the logical network service function chain 102c shown in FIG. 1. Thus, packets of the Return Traffic 1 packet flow traverse the analytics NF 213, the NAT NF 212, and the DPI NF 210.

While some NFs simply inspect or selectively drop packets, some NFs may modify packet headers at one or more levels of a network traffic protocol stack. In instances where a packet's header is significantly modified, the centralized packet classifier module 336 may not correctly identify an associated flow for a received packet. If the centralized packet classifier module 336 cannot correctly identify an associated flow for a received packet, the centralized packet classifier module 336 may simply drop the packet or may rely on the centralized controller module 234 to assign a return traffic path for that packet. A newly assigned return traffic path by the centralized controller module 234, while perhaps adhering to a correct logical network function service chain, may not include the particular instances of NFs that forward network traffic of that packet's flow traversed. If one of those particular instances of NFs holds a state associated with that packet's flow, return traffic traversing a different instance of that NF may not maintain a correct network state for the network 200.

Additionally, if a particular instance of an NF becomes saturated with network traffic, one or more new instances of that NF may be provisioned in the network (e.g., within one of the compute nodes 230-233 or within another compute node). The centralized controller module 234 may be notified of the additional instances of the NF which were provisioned. In response, the centralized controller module 234 may generate new forward and/or return traffic path information for particular packet flows of the network 200, and then send an update to the centralized packet classifier modules 235, 336. When generating the new forward and/or return traffic path information for the particular packet flows of the network 200, the centralized controller module 234 may also consider whether any of the particular flows rely on a state preserved at the particular instance of the NF which had become saturated. Conversely, if the traffic of the network 200 decreases, instances of particular NFs may be removed from operation. Once again, the centralized controller module 234 may consider the state of particular packet flows, and once again may update the centralized packet classifier modules 235, 336 with updated forward traffic path information and return traffic path information. Such reliance on a centralized controller module can contribute to overall latency within a network, deteriorate packet throughput of the network, and result in other inefficiencies of the network.

Figure 4:
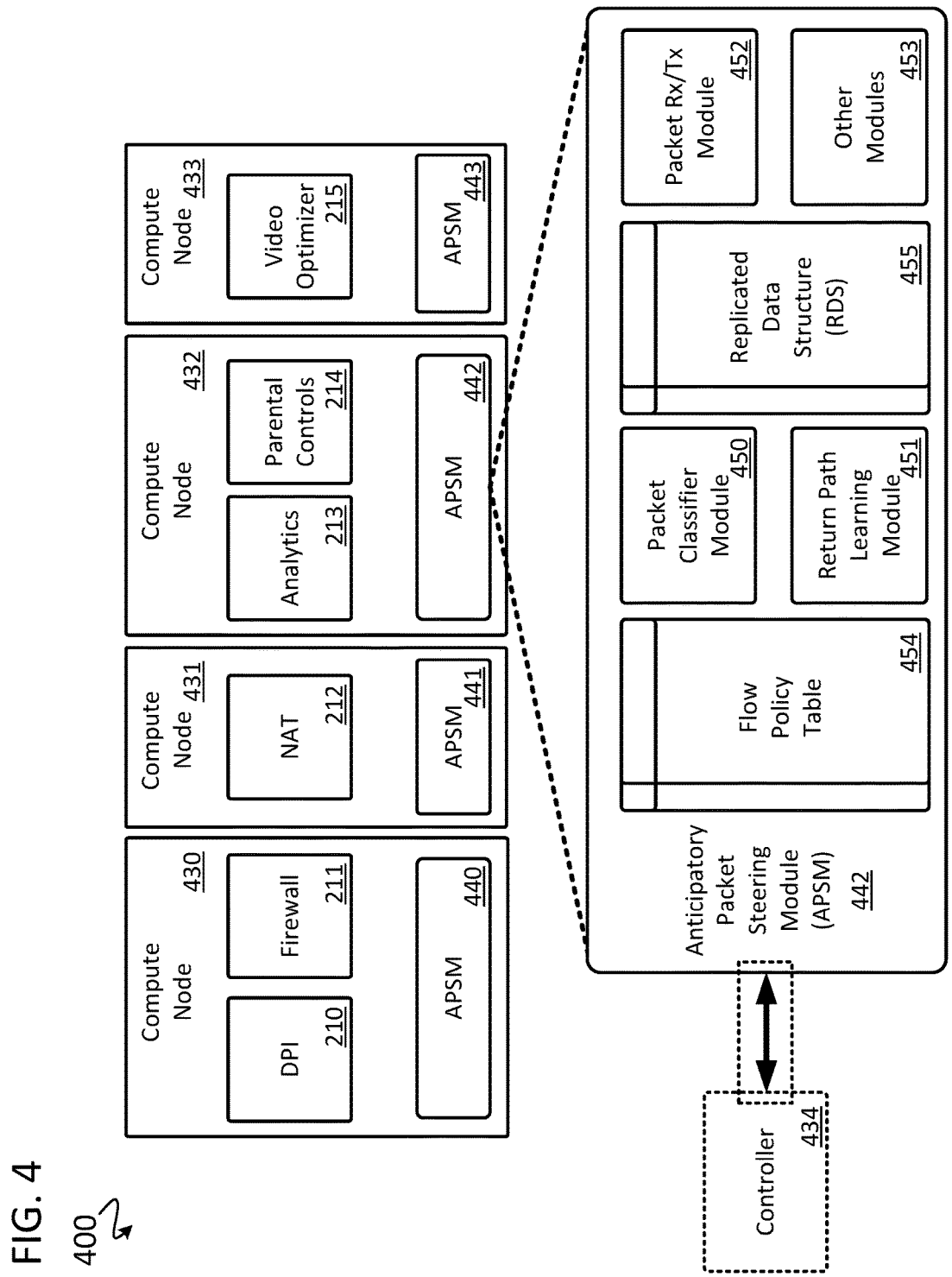
FIG. 4 illustrates an example network service architecture of a network for distributed bidirectional anticipatory packet steering, in accordance with some embodiments.

An example network service architecture of a network 400 for bidirectional anticipatory packet steering, in accordance with some embodiments, is shown in FIG. 4. The network 400 generally includes the compute nodes 430-433. The compute nodes 430-433 are similar to the compute nodes 230-233, except as described herein. The network functions 210-215 are provisioned across the compute nodes 430-433. However, a centralized controller module 434 is only optionally included (as indicated by dashed lines) and the centralized packet classifier modules 235, 336 are omitted. Each of the compute nodes 430-433 includes a respective anticipatory packet steering module (APSM) 440-443. Details of the APSM 442 are illustrated in an enlarged view, but each of the APSMs 440-443 includes the same or similar modules and data structures. As shown, the APSM 442 includes a packet classifier module 450, a return path learning module 451, a packet Rx/Tx module 452, and other modules 453. A flow policy table 454 and a replicated data structure (RDS) are stored locally at the APSM. After a synchronization step between the APSMs 440-443 has been performed, as will be described later in detail, data of the RDS 455 locally stored at the APSM 442 includes the same data as each respective RDS stored at the APSMs 440-441 and 443. In some embodiments, the RDS 455 is embodied as a replicated hash table.

Described at a high level, the flow policy table 454 associates packet flows of the network 400 with logical network function chains similar to those discussed with reference to FIG. 1 (e.g., {Forward Traffic 1: DPI, Firewall, NAT, Analytics}). The RDS 455 associates packet flows of the network 400 with particular instances of NFs which, when communicatively chained, realize a logical network function chain (e.g., {Forward Traffic 1: DPI NF 210, Firewall NF 211, NAT NF 212, Analytics NF 213}).

Said another way, the flow policy table 454 includes forward and/or return traffic path information for logical network service function chains and associates the forward and/or return traffic path information with particular packet flows, or classes of packet flows, of the network 400. For example, the flow policy table 454 may include identifiers for a logical network service function chain that includes a DPI NF, a firewall NF, a NAT NF and an analytics NF and further indicates an association between that logical network service function chain and a particular packet flow or a class of packet flows. The RDS 455 includes an association between each packet flow and forward and/or return traffic path information for particular instances of NFs. That is, the RDS stores an association (e.g., a mapping) between an identifier of a packet flow (e.g., an FID) and a set of NF instances that packets in the packet flow may traverse. The association between a packet and or packet flow and the set of NF instances can be realized using the FID. In some embodiments, the FID is a 5 tuple of the packet flow which includes {src/dst IP address, src/dst ports, protocol}. In some embodiments, the association or FID includes source or destination prefixes, protocol type, VLAN number, and or other suitable identifiers. Data of each RDS is replicated across each of the APSMs 440-443.

The forward and/or return traffic path information stored at the RDS 455 identifies particular NF instances associated with the logical network service function chains. In some embodiments, the forward and/or return traffic path information includes an order of particular NF instances which a particular packet flow will traverse. In some embodiments, packets traversing a network service chain may take a different path through the network service chain based on decisions made at a particular NF. For instance, a DPI NF may forward a received packet to a video optimizer NF if the received packet is associated with video content, but not forward a received packet to the video optimizer NF if the received packet is not associated with video content. Thus, in some embodiments, the forward and/or return traffic path information includes an ordered data structure identifying a series of NFs, but the packet may not traverse each of the NFs in that series.

Described at a high level, the packet classifier module 450 populates the RDS 455 with forward traffic path information generated using the flow policy table 454, and the return path learning module 451 conditionally populates the RDS 455 with return traffic path information associated with a packet flow before egress of a packet of that flow from the APSM 442. Further details are discussed later.

The packet Rx/Tx module 452 generally receives packets at the APSM 442 on packet ingress (Rx) and forwards packets from the APSM 442 on packet egress (Tx). The other modules include one or more of storage modules, control modules, communication modules, analytics modules, diagnostic modules, packet routing modules, packet filtering modules, computational modules, or still other modules. The APSM 442 is implemented as a software module in some embodiments, as dedicated hardware in other embodiments, and as a combination of the two in still other embodiments. Any of the APSMs 440-443, the compute nodes 430-433, and/or the NFs 210-215 can be considered to be a network node of the network 400. Any of the NFs 210-215 can be considered to be a service node of the network 400.

Figure 5:
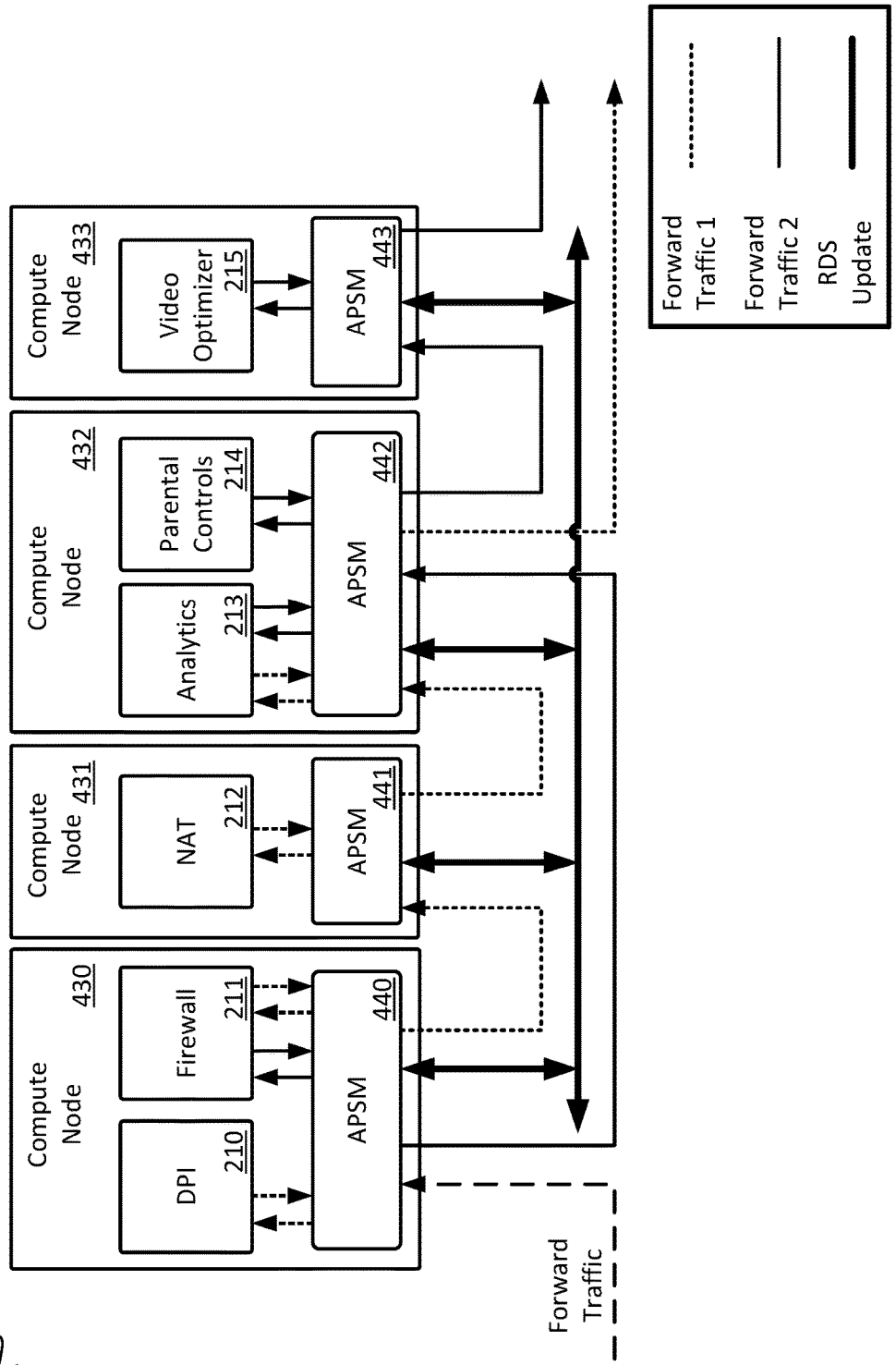
FIG. 5 illustrates network traffic traversing an example network service architecture of a network for distributed bidirectional anticipatory packet steering, in accordance with some embodiments.

FIG. 5 illustrates a flow of Forward Traffic through the compute nodes 430-433 of the network 400, in accordance with some embodiments. The Forward Traffic (shown as a thin dashed line) of the network 400 includes packets of two packet flows: Forward Traffic 1 (shown as a thin dotted line), and Forward Traffic 2 (shown as a thin solid line). The APSMs 440-443 steer packets of Forward Traffic 1 and Forward Traffic 2 through the NFs 210-215 to realize the logical network service function chains 102a-b of FIG. 1. The packets of Forward Traffic 1 and Forward Traffic 2 are steered to the NFs 210-215 according to forward traffic path information identified or generated by one or more of the APSMs 440-443. In some embodiments, generating or identifying the forward traffic path information (and/or return traffic path information) involves retrieving data stored at one or more tables (e.g., the flow policy table or the RDS) at an APSM of the APSMs 440-443. In such embodiments, the retrieved data may be used directly, formatted, or transformed to generate the forward traffic path information (and/or return traffic path information). Upon identifying or generating forward traffic path information associated with these flows at one of the APSMs 440-443, an RDS Update (shown as a thick solid line) is communicated to one or more of the other APSMs 440-443. In some embodiments, the RDS Update is communicated using a control plane of the network 400. In other embodiments, the RDS Update is communicated using a data plane of the network 400. In some embodiments, the RDS Update is communicated to the APSMs 440-443 using a broadcast communication protocol. In other embodiments, the RDS Update is relayed through a data store structure to the APSMs 440-443. In yet other embodiments, the RDS is relayed through the controller 434 to the APSMs 440-443. In still yet other embodiments, the RDS is communicated to the APSMs 440-443 by a peer-topeer communication between the APSMs 440-443. That is, the RDS Update is communicated from one APSM to another APSM without traversing a centralized controller of the network 400. Further, in some embodiments, the RDS Update is communicated to each of the APSMs 440-443 regardless of whether a particular APSM will receive packets of a packet flow associated with the RDS Update.

Figure 6:
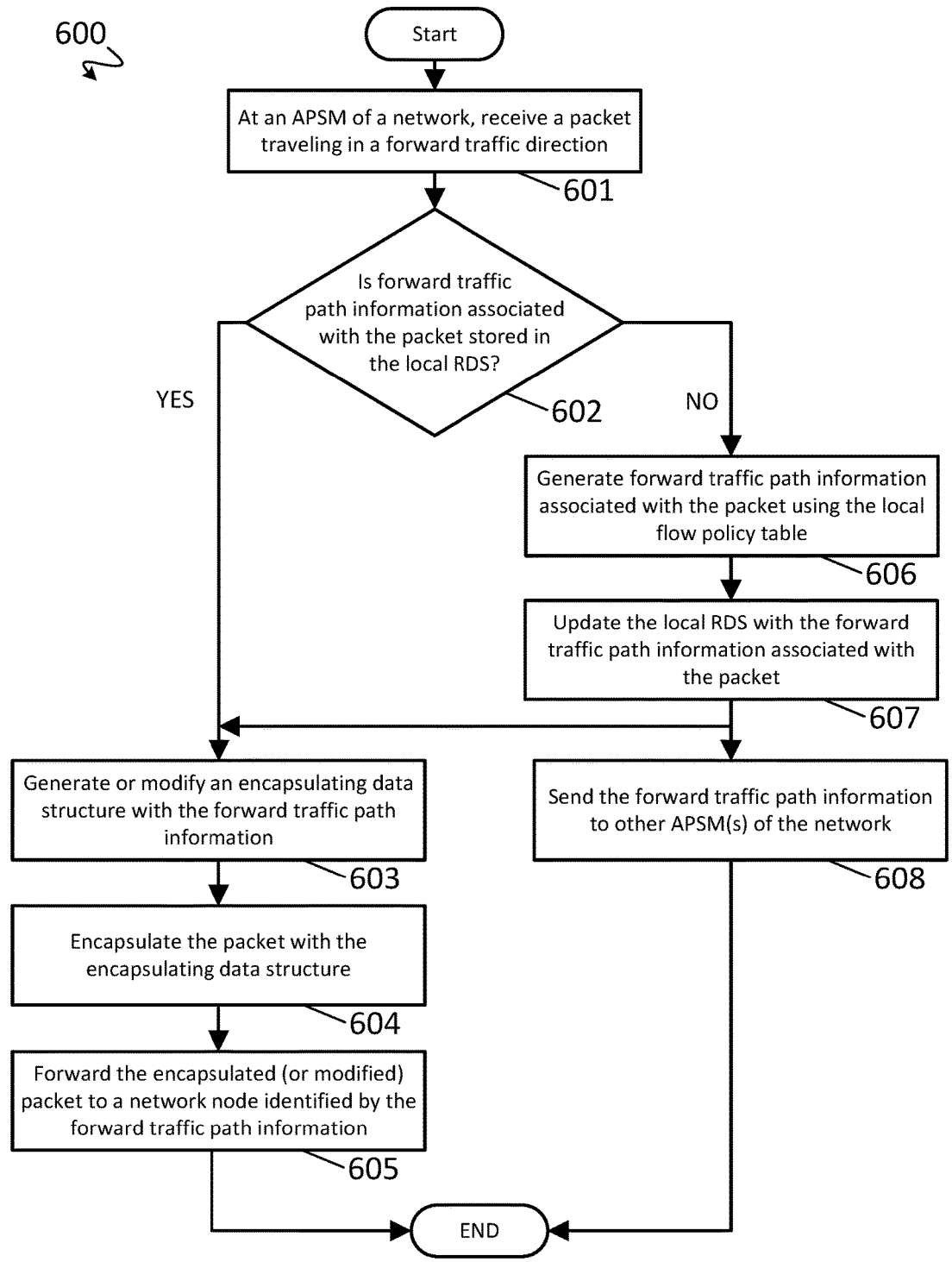
FIG. 6 illustrates a portion of a method for distributed bidirectional anticipatory packet steering, in accordance with some embodiments.

With reference to FIG. 5, FIG. 6 illustrates a portion of a method 600 for bidirectional anticipatory packet steering, in accordance with some embodiments. The particular steps, order of steps, and combination of steps is shown for illustrative and explanatory purposes only. Other embodiments can implement different particular steps, orders of steps, and combinations of steps to achieve similar functions or results. At step 601, a packet of Forward Traffic traveling in a forward traffic direction is received at the APSM 440, which is similar to the APSM 442. At step 602, a packet classifier module (similar to the packet classifier module 450) of the APSM 440 determines if forward traffic path information associated with the received packet is stored in the local RDS (similar to the RDS 455) of the APSM 440. If that forward traffic path information is stored in the local RDS, the forward traffic path information is retrieved and used at step 603 to either generate an encapsulating data structure or modify an existing encapsulating data structure. In some embodiments, the encapsulating data structure is a header of the received packet. In some embodiments, a new header is created using the forward traffic path information, and in some embodiments, an existing header of the packet is modified to contain or to be otherwise associated with the forward traffic path information. In some embodiments, the encapsulating data structure can be the same or similar to a network service header (NSH), though the encapsulating data structure is not limited to that particular implementation. In some embodiments, other data associated with the received packet that is not considered to be a header is modified based on the forward traffic path information. For instance, padding data, or other data that is typically unused could advantageously store the forward traffic path information. In such embodiments, the modified received packet, padding data, modification of an existing packet header, or other data is still referred to herein as an encapsulating data structure.

At step 604, the received packet is encapsulated with the generated encapsulating data structure. If an existing header or other data of the received packet was modified with the forward traffic path information, step 604 may be skipped. At step 605, the encapsulated (or modified) packet is forwarded to a network node identified by the forward traffic path information. In some embodiments, that network node is one of the compute nodes 430-433 of the network 400, a compute node of another network, one of the NFs 210-215 of the network 400 or of another network, or one of the APSMs 441-443 of the network 400 or of another network. In some embodiments, the network node may be a network node that does not include an APSM. In some embodiments, the network node is a virtual machine or a container provisioned on one of the compute nodes 430-433 of the network 400 or on a compute node of another network. An example of step 605 is illustrated in FIG. 5, which shows the APSM 440 receiving Forward Traffic and then forwarding packets of two flows, Forward Traffic 1 and Forward Traffic 2 to NFs of the network 400. As shown, the APSMs 440, 441, 442 steer packets of Forward Traffic 1 such that those packets traverse the DPI NF 210, the firewall NF 211, the NAT NF 212, and the analytics NF 213. Thus, the packets of Forward Traffic 1 traverse a chain of NFs in accordance with the logical network service function chain 102a shown in FIG. 1.

The APSMs 440, 442, 443 steer packets of Forward Traffic 2 such that those packets traverse the firewall NF 211, the analytics NF 213, the parental controls NF 214, and the video optimizer NF 215. Thus, the packets of Forward Traffic 2 traverse a chain of NFs in accordance with the logical network service function chain 102b shown in FIG. 1.

Returning attention to step 602, if at step 602 it is determined that forward traffic path information associated with the received packet is not stored in the RDS of the APSM 440, flow of the method 600 continues to step 606. At step 606, the packet classifier module of the APSM 440 uses the flow policy table stored at the APSM 440 to generate forward traffic path information associated with the received packet. At step 607, the RDS stored at the APSM 440 is updated with the forward traffic path information associated with the received packet. As discussed earlier, the forward traffic path information associated with the received packet identifies a set of network nodes (e.g., the NFs 210-215) of the network 400 that the received packet shall traverse. Flow branches from 607 back to step 603, which was discussed previously, and also to step 608. In some embodiments, flow branches from step 606 back to step 603. At step 608, the APSM 440 sends the forward traffic path information to one or more of the APSMs 441-443 of the network 400 via an RDS update. The RDS update between the APSMs 440-443 is designated in FIG. 5 as RDS Update. In some embodiments, the RDS Update is communicated (e.g., transmitted or otherwise shared) between each of the APSMs 440-443 using peer-to-peer communication or another form of communication (e.g., broadcast, or relay) as previously described with respect to FIG. 4. That is, in some embodiments, the RDS Update is shared to each of the APSMs 440-442 without being communicated to a centralized controller of the network 400. In some embodiments, the RDS Update is shared with each of the other APSMs 440-443 regardless of whether a particular APSM is associated with the forward traffic path information. That is, an APSM which will not forward a packet to a particular instance of an NF of an SFC will still receive and store the forward traffic path information associated with that packet. In some embodiments, the RDS Update is sent from the APSM 440 to the APSMs 441-443. In other embodiments, the RDS Update is sent from the APSM 440 to fewer than all the APSMs 441-443. In such embodiments, the particular APSM 441-443 which received the RDS Update then communicates the RDS Update to the other APSMs of the network 400. In some embodiments, the RDS Update is communicated between the APSMs 440-443 using a gossip protocol (e.g., a periodic or event-driven pairwise communication where each receiving APSM changes a state of that APSM to reflect or match a state of a transmitting APSM). In some embodiments, the RDS Update is communicated between the APSMs 440-443 using another protocol that is suitable for updating the respective replicated data structures stored at the APSMs 440-443. In some embodiments, the RDS Update includes all the data included in one of the replicated data structures stored at the APSMs 440-443. In some embodiments, the RDS Update includes less than all the data included in one of the replicated data structures stored at the APSMs 440-443. In some embodiments, the RDS Update is transmitted to the optional centralized controller module 434, or to another element or compute node of the network 400 in addition to being communicated between the APSMs 440-443. In some embodiments, the RDS Update is transmitted using a data plane of the network 400, and in other embodiments, the RDS Update is transmitted using a control plane of the network 400.

In addition to identifying or generating forward traffic path information, the APSMs 440-443 advantageously learn return traffic path information of packets of a flow (e.g., Forward Traffic 1, Forward Traffic 2) before those packets egress from one or more of the APSMs 440-443, and the RDS stored at the APSM 440-443 is conditionally updated with the return traffic path information associated with each received packet. Such learned return traffic path information advantageously enables the APSMs 440-443 to steer packets of that flow traveling in a return direction to a correct network node (e.g., one of the NFs 210-215), even if the packets traveling in the return traffic direction of that flow have significantly different headers than packets traveling in a forward traffic direction of that flow. Upon learning return traffic path information associated with a packet flow at one of the APSMs 440-443, an RDS Update is communicated to one or more of the other APSMs 440-443.

Figure 7:
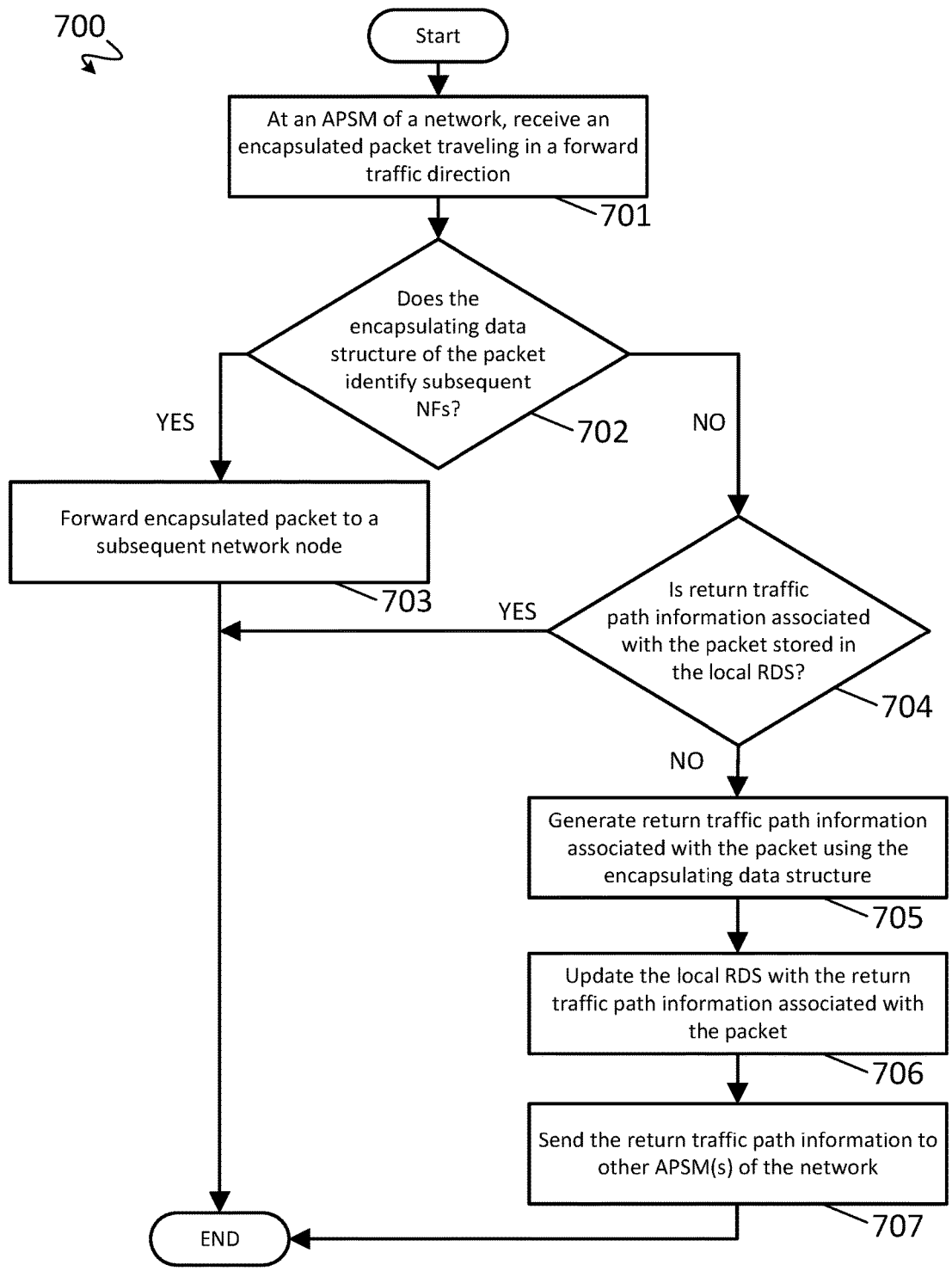
FIG. 7 illustrates a portion of a method for distributed bidirectional anticipatory packet steering, in accordance with some embodiments.

FIG. 7 illustrates a portion of a method 700 for learning return traffic path information associated with packets of a packet flow, in accordance with some embodiments. The particular steps, order of steps, and combination of steps is shown for illustrative and explanatory purposes only. Other embodiments can implement different particular steps, orders of steps, and combinations of steps to achieve similar functions or results. Return traffic path information is learned by the APSMs 440-443 as one or more packets of a flow leave a final NF of a network service function chain which that flow was traversing. In other embodiments, return traffic path information is learned by the APSMs 440-443 regardless of whether a packet has left a final NF of a network service function chain which that flow was traversing. Steps of the method 700 are described with reference to FIG. 5. At step 701, an APSM (e.g., the APSM 442) receives an encapsulated packet of a packet flow (e.g., Forward Traffic 1) traveling in a forward traffic direction (e.g., from the analytics NF 213). At step 702, the APSM 442 determines if an encapsulating data structure of the received packet identifies subsequent NFs which the received packet is to traverse. For example, after traversing the analytics NF 213, packets of Forward Traffic 2 continue on to traverse the parental controls NF 214 and the video optimizer NF 215. Thus, if the received encapsulated packet is of Forward Traffic 2, the received encapsulated packet is forwarded by the APSM 442 to a subsequent network node (e.g., the parental controls NF 214) at step 703.

Packets of Forward Traffic 1, however, do not traverse another NF of the NFs 210-215 after traversing the analytics NF 213. Thus, the method 700 would continue from step 702 to step 704 where it is determined if return traffic path associated with the received packet is already stored in the local RDS (e.g., the RDS 455). If return traffic path associated with the received packet is not stored in the local RDS 455, at step 705 return traffic path information associated with the received encapsulated packet is generated using the encapsulating data structure. In some embodiments, the return traffic path information is generated, or "learned," using forward traffic path information which was included in the generated encapsulating data structure at step 603 of the method 600.

In some embodiments, generating/learning the return traffic path information includes using the encapsulating data structure to identify a sequence of particular instances of NFs which were traversed by the encapsulated packet in a forward traffic direction (e.g., forward traffic path information) and reversing that sequence. In some embodiments, the sequence of particular instances of NFs is associated with a 5-tuple that includes an indication of a forward network source and a forward network destination. In such embodiments, the generated/learned return traffic path information is associated with a 5-tuple having the forward network source as a return network destination and the forward network destination as the return network source.

At step 706, the local RDS 455 is updated with the generated return traffic path information. Then, at step 707, the generated return traffic path information is sent to one or more of the other APSMs 440-441, 443 of the network 400 via the RDS Update communication shown in FIG. 5 and described with reference to step 608 of the method 600. After step 707, the packet within the received encapsulated packet is typically forwarded to one or other nodes of the network 400, or to another network. In some embodiments, the encapsulating data structure is removed from the encapsulated packet before the packet is forwarded.

Figure 8:
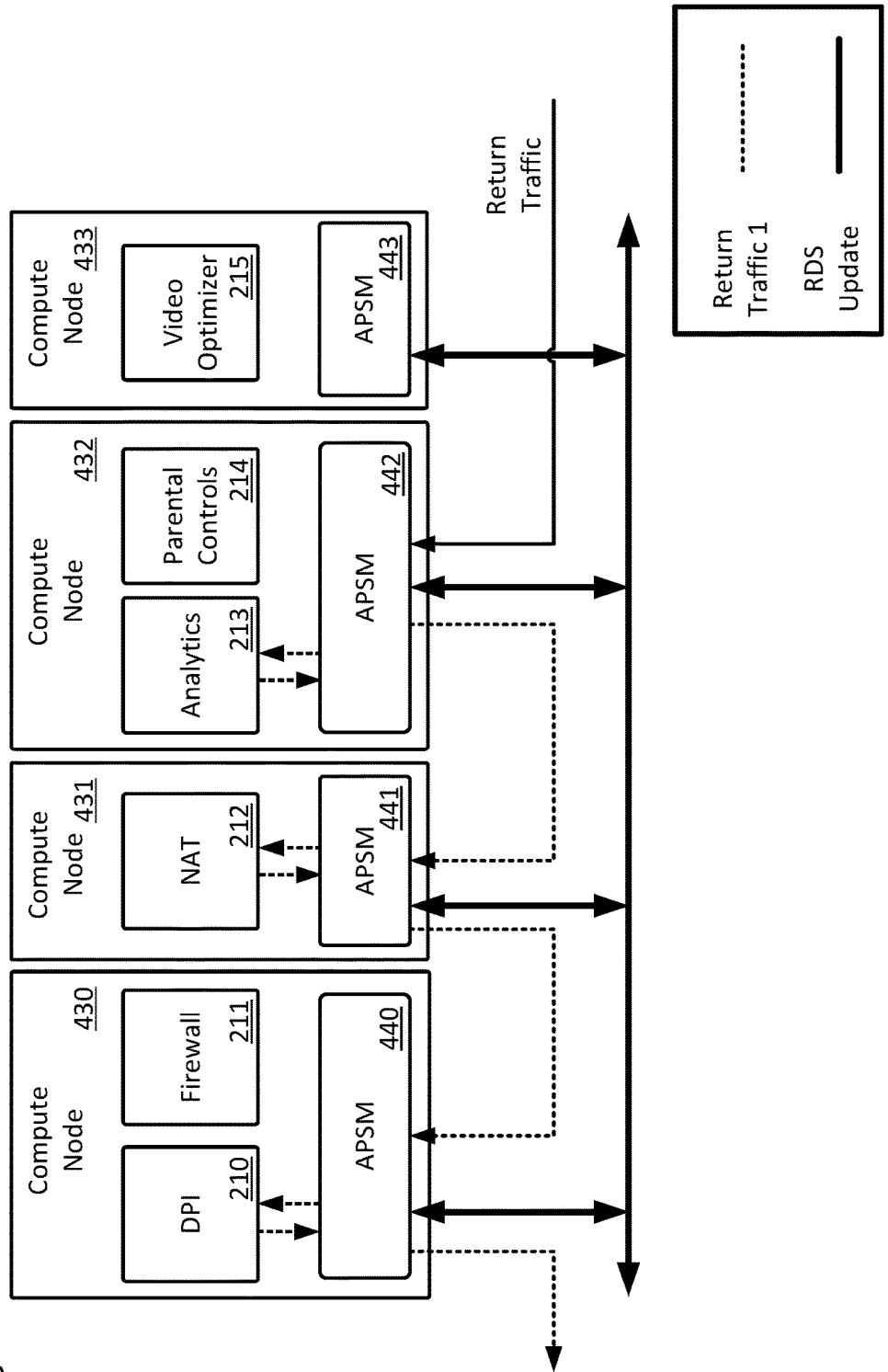
FIG. 8 illustrates network traffic traversing an example network service architecture of a network for distributed bidirectional anticipatory packet steering, in accordance with some embodiments.

FIG. 8 illustrates a flow of Return Traffic through the compute nodes 430-433 of the network 400, in accordance with some embodiments. The Return Traffic (shown as a thin solid line) includes one or more packets of a packet flow designated as Return Traffic 1 (shown as a thin dotted line). An RDS Update communicated between the APSMs 440-443 is shown as a thick solid line. Return Traffic 1 is a return packet flow for packets corresponding to Forward Traffic 1. The APSMs 440-443 steer packets of Return Traffic 1 through the NFs 210-215 to realize the logical network service function chain 102c shown in FIG. 1. The packets of Return Traffic 1 are steered to the NFs 210-215 according to return traffic path information identified or learned by one or more of the APSMs 440-443 as described with reference to the method 700.

Figure 9:
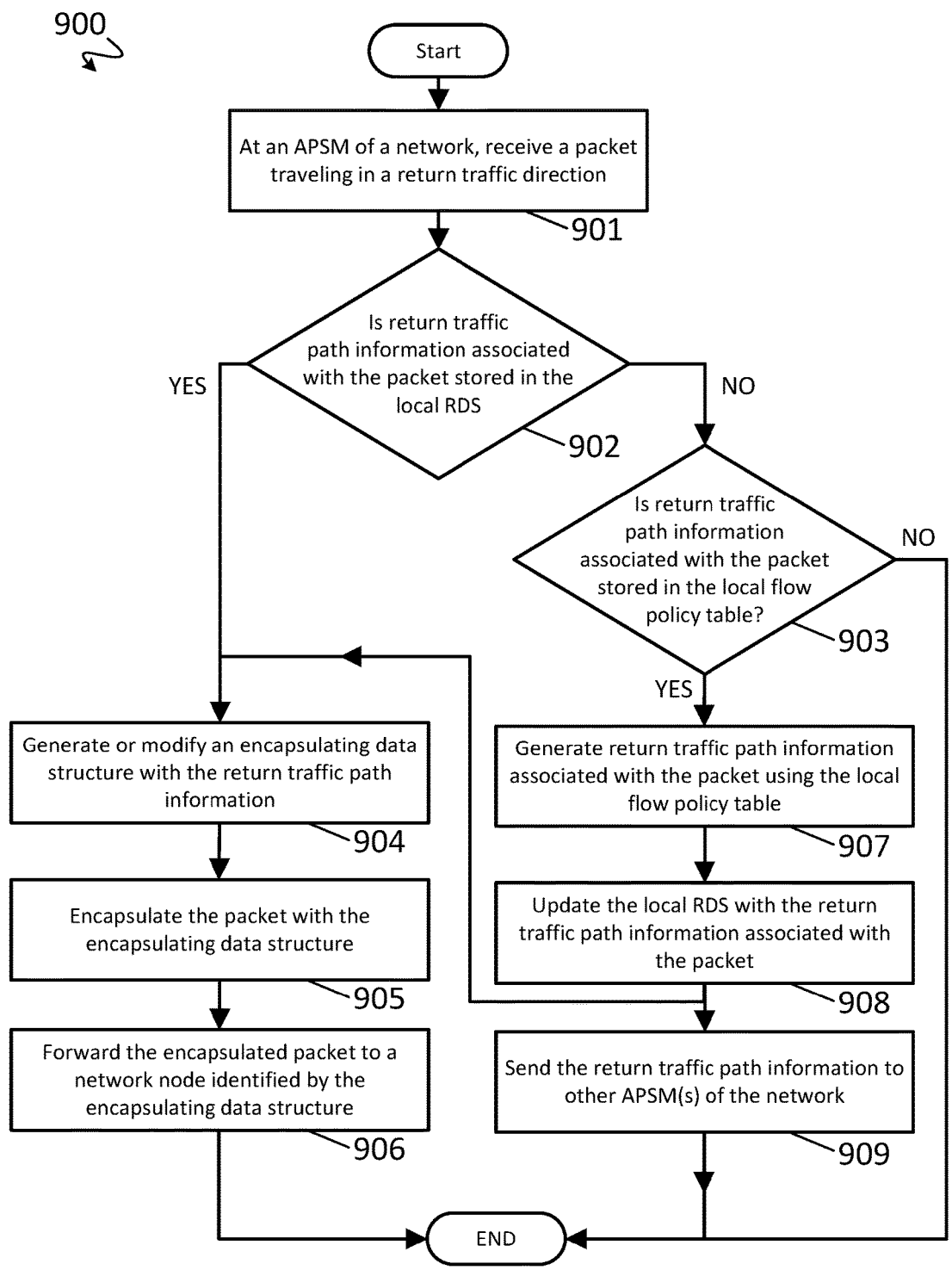
FIG. 9 illustrates a portion of a method for distributed bidirectional anticipatory packet steering, in accordance with some embodiments.

With reference to FIG. 8, FIG. 9 illustrates a portion of a method 900 for steering packets traveling in a return network traffic direction, in accordance with some embodiments. The particular steps, order of steps, and combination of steps is shown for illustrative and explanatory purposes only. Other embodiments can implement different particular steps, orders of steps, and combinations of steps to achieve similar functions or results. At step 901 a packet traveling in a return traffic direction (e.g., Return Traffic) is received at an APSM (e.g., the APSM 442) of the network 400. At step 902, it is determined at the APSM if return traffic path information associated with the received packet is stored in the RDS stored at that APSM (e.g., the RDS 455). In some embodiments, the return traffic path information includes a set of identifiers which identify particular instances of NFs within a network service function chain that packets of a packet flow shall traverse in a return network traffic direction. In some embodiments, the packet traverses less than the full set of particular NF instances based on routing decisions made by the identified NF instances. In some embodiments, the return traffic path information was learned at an APSM using a method that is the same or similar to the method 700.

If it is determined at step 902 (e.g., by the packet classifier module 450) that return traffic path information associated with the received packet is stored at the local RDS of the APSM, flow continues to step 904. At step 904, an encapsulating data structure is generated using retrieved return traffic path information, or an existing header or data structure of the packet is modified using the return traffic path information. The encapsulating data structure is generated or modified in the same or similar way as was described at step 603 of FIG. 6. At step 905, the received packet is encapsulated with the encapsulating data structure, and at step 906 the encapsulated packet is forwarded to a network node identified by the encapsulating data structure (e.g., the analytics NF 213).

Returning attention back to step 902, if it is determined that return traffic path information associated with the received packet is not stored at the local RDS of the APSM, flow continues to step 903. At step 903, if it is determined that return traffic path information associated with the received packet is stored in the local flow policy table stored at the APSM, flow continues to step 907. If it is determined at step 903 that return traffic path information associated with the received packet is not stored in the local flow policy table, the received packet is handled according to operator policy. In some embodiments, step 903 is optional.

In some embodiments, at least a portion of return traffic path information associated with packets of a packet flow is stored in the local policy table. In such embodiments, the RDS stored at each APSM includes return traffic path information which was learned as described with reference to method 700, as well as return traffic path information which was generated using a local flow policy table of an APSM.

At step 907, return traffic path information associated with the received packet is generated using the local flow policy table (e.g., the flow policy table 454). At step 908, the RDS stored at the APSM is updated with the return traffic path information. In some embodiments, after step 908, flow of the method 900 branches back to step 904, which was discussed previously, and also branches to step 909. In other embodiments, flow of the method 900 branches back to step 904 after step 907. At step 909, the generated return traffic path information is communicated to the other APSMs 440-441, 443 of the network 400 via an RDS update (e.g., designated as RDS Update). Communication of the RDS update with reference to FIG. 8 and FIG. 9 is the same or similar to the RDS update discussed with reference to methods 600, 700 and FIG. 5. The generated or identified return traffic path information is similar to the forward traffic path information discussed previously.

Figure 10:
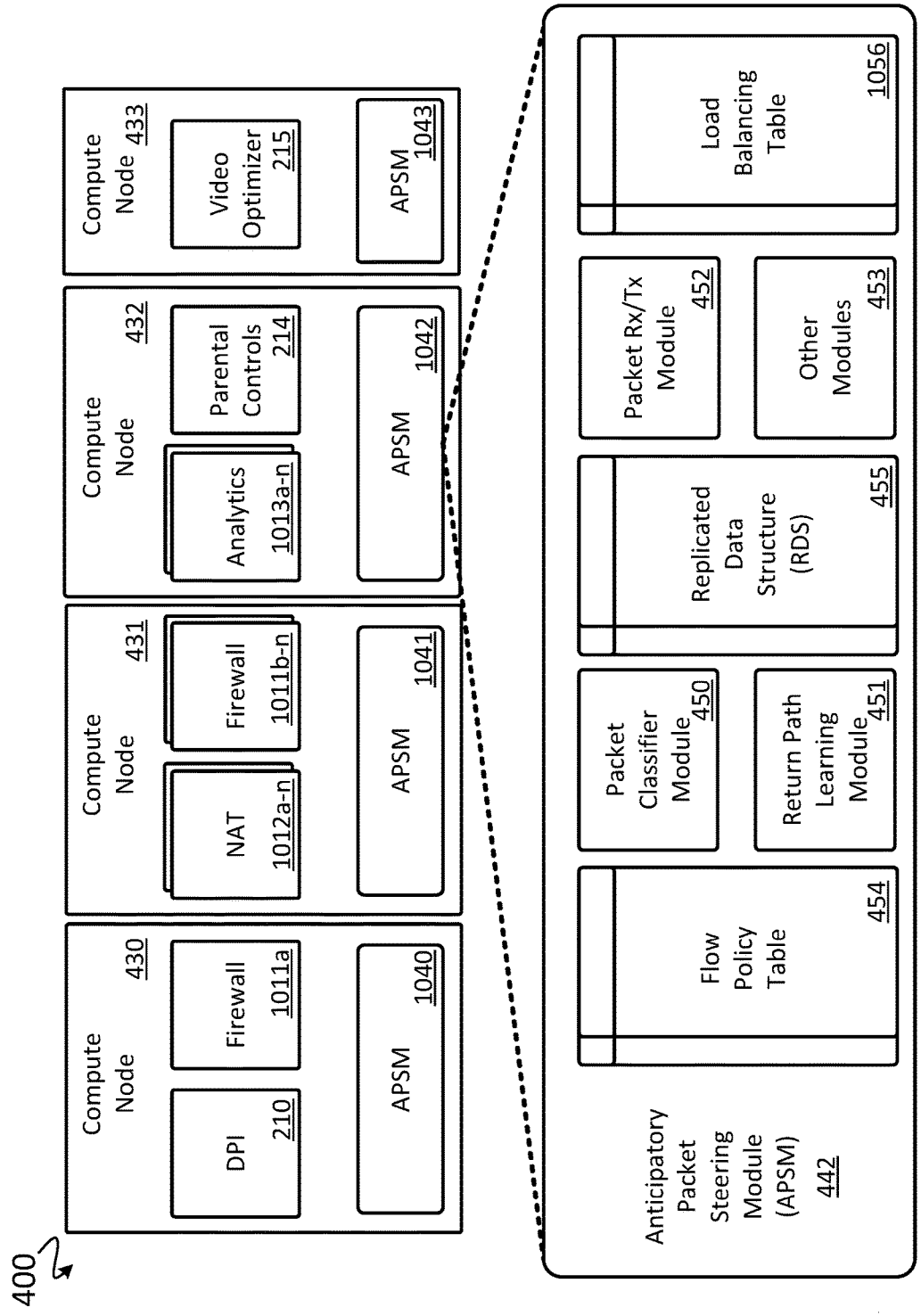
FIG. 10 illustrates an example network service architecture of a network for distributed bidirectional anticipatory packet steering, in accordance with some embodiments.

In some embodiments, if network traffic through a particular instance of an NF of the network 400 increases such that performance of that NF deteriorates, another instance of that NF type may be provisioned on the same compute node or on a different compute node of the network 400. For example, if a particular instance of a firewall NF is becoming saturated with network traffic, another instance of a firewall NF is provisioned. FIG. 10 illustrates an example embodiment of the network 400 where multiple instances of some NFs are provisioned across the compute nodes 430-433, in accordance with some embodiments.

For example, the compute node 231 includes multiple instances of NAT NFs 1012a-n and multiple instances of firewall NFs 1011b-n. Similarly, the compute node 232 includes multiple instances of analytics NFs 1013a-n. The compute nodes 230-233 include APSMs 1040-1043. The APSMs 1040-1043 are each similar to the APSMs 440-443, with the addition of a load balancing table 1056. In some embodiments, two or more of the flow policy table 454, the RDS 455, and the load balancing table 1056 are included in the same table. For example, in some embodiments, data of separate tables is stored as separated fields within a single table.

Figure 11:
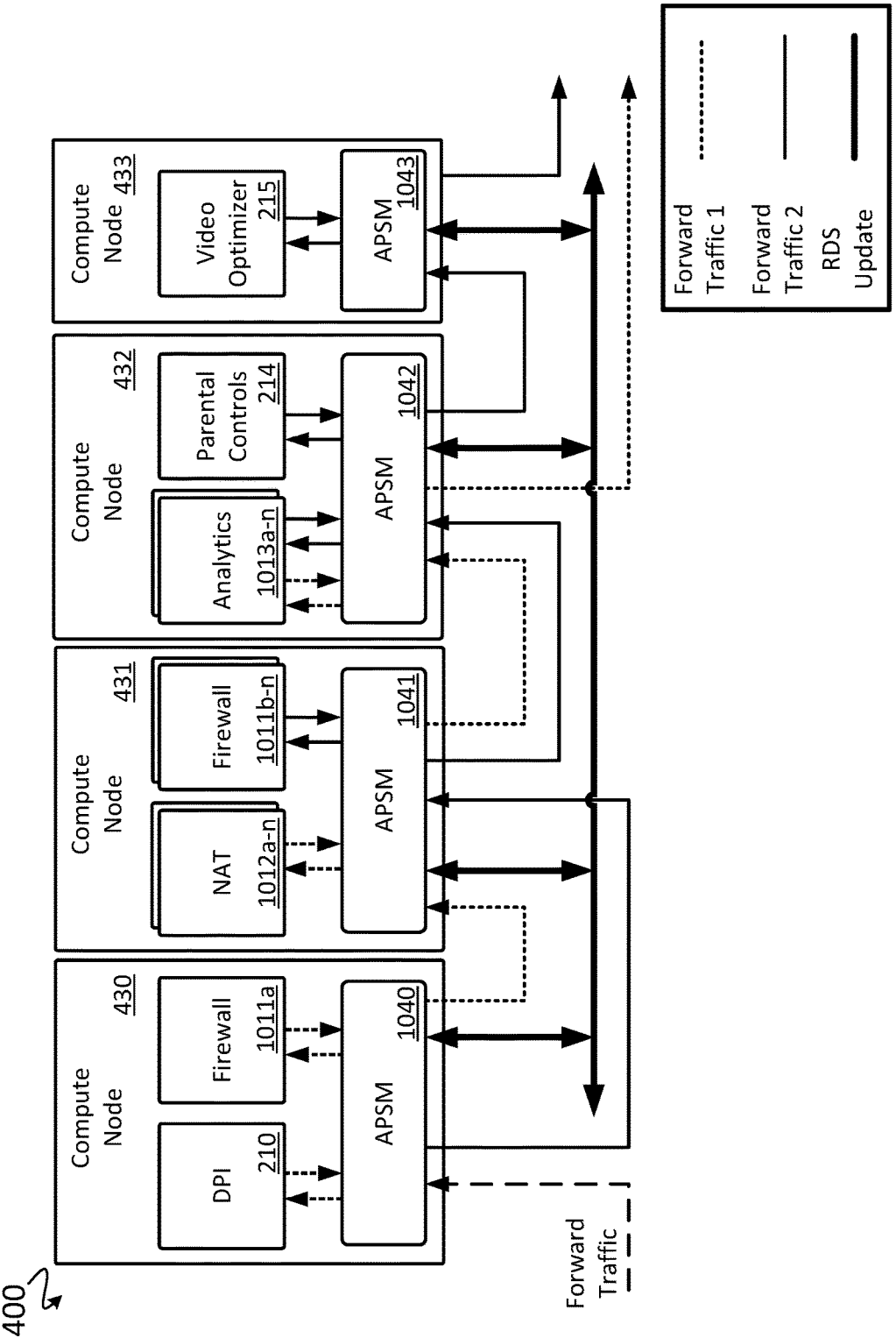
FIG. 11 illustrates network traffic traversing an example network service architecture of a network for distributed bidirectional anticipatory packet steering, in accordance with some embodiments.

FIG. 11 illustrates Forward Traffic of the network 400 traversing the compute nodes 230-233 of the network 400, in accordance with some embodiments. The Forward Traffic (designated as a thin dashed line) of the network 400 includes packets of two packet flows, Forward Traffic 1 (designated as a thin dotted line), and Forward Traffic 2 (designated as a thin solid line). RDS Updates (designated as a thick solid line) are shared between the APSMs 1040-1043 as forward traffic path information and/or return traffic path information is generated or learned by the APSMs 1040-1043, as previously described. In the embodiment shown, the flow policy table 454 includes one or more sets of logical NF identifiers. Each set of logical NF identifiers describe a logical network service function chain which packets of a packet flow associated with that network service function chain shall traverse. For example, with reference to the logical network service function chains 102a-c, the flow policy table 454 includes identifiers for the following sets of logical NFs: {Forward Traffic 1: DPI, Firewall, NAT, Analytics}, {Forward Traffic 2: Firewall, Analytics, Parental Controls, Video Optimizer}, {Return Traffic 1: Analytics, Nat, DPI}. In some embodiments, as was described with reference to the method 700, Return Traffic 1 is not included in the flow policy table 454 and is instead learned by an APSM on packet egress from the network service function chain.

For each NF of the network 400, the load balancing table 1056 includes a set of identifiers which identify particular instances of that NF. For example, the load balancing table 1056 shown in FIG. 10 includes identifiers for the following NF instances: {DPI: 210}, {Firewall: 1011a, 1011b . . . 1011n}, {NAT: 1012a, 1012b . . . 1012n}, {Analytics: 1013a, 1013b . . . 1013n}, {Parental Controls: 214}, {Video Optimizer: 215}.

The RDS 455 includes one or more sets of identifiers which describe a particular instance of a network service function chain. That is, each set of NF instance identifiers describes a set of particular NF instances which packets of a packet flow associated with that set shall traverse. With reference to the sets of logical NFs identified in the flow policy table 454 and the identifiers stored in the load balancing table 1056 described with reference to FIG. 10, the RDS 455 includes the following example sets of forward traffic path information: {Forward Traffic 1: DPI NF 210, Firewall NF 1011a, NAT NF 1012a, Analytics NF 1013a}, {Forward Traffic 2: Firewall NF 1011b, Analytics NF 1013a, Parental Controls NF 214, Video Optimizer NF 215}.

In some embodiments, when constructing or updating a network service function chain, the packet classifier module of an APSM (e.g., the packet classifier module 450) uses the sets of NF instance identifiers stored at the load balancing table of that APSM to select particular NF instances which packets of a packet flow shall traverse. These sets of NF instance identifiers are used by the packet classifier module when generating forward traffic path information and/or return traffic path information. Based on criteria produced by a load balancing algorithm, the packet classifier selects a particular NF instance identifier from the load balancing table 1056 for each of the logical NFs included in the flow policy table 454 and stores the set of particular NF instances in the RDS 455.

Figure 12:
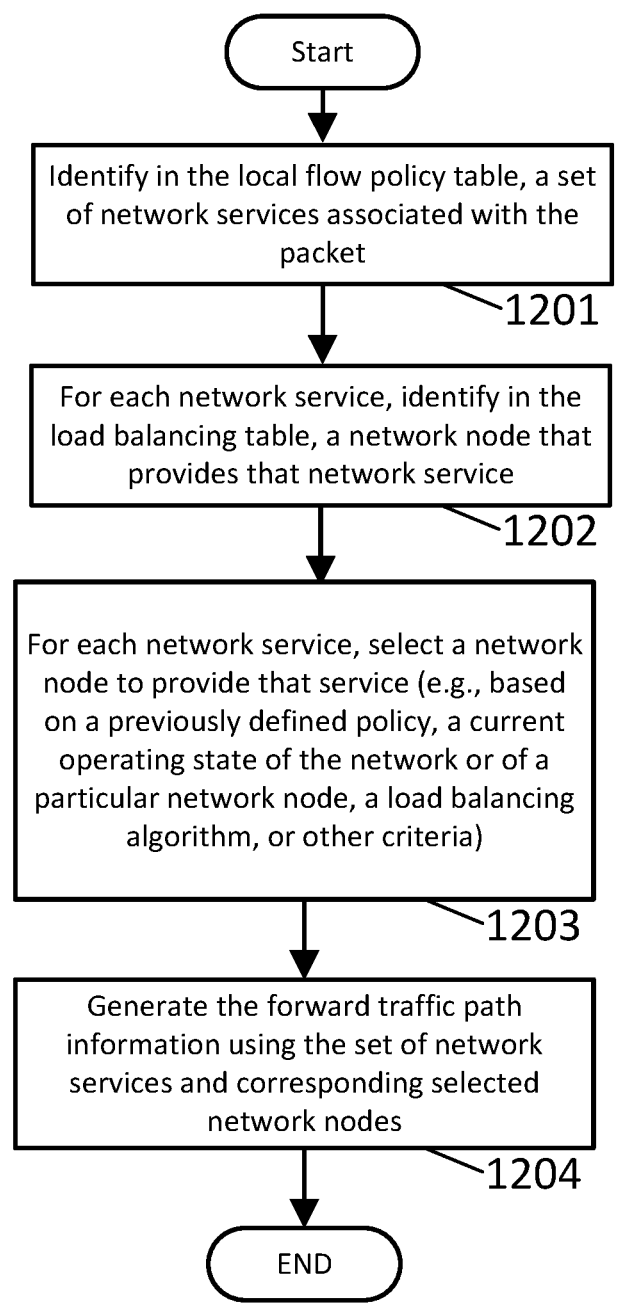
FIG. 12 illustrates a portion of a method for distributed bidirectional anticipatory packet steering, in accordance with some embodiments.

FIG. 12 includes a portion of a method 1200 for generating forward traffic path information using the load balancing table, in accordance with some embodiments. The particular steps, order of steps, and combination of steps is shown for illustrative and explanatory purposes only. Other embodiments can implement different particular steps, orders of steps, and combinations of steps to achieve similar functions or results. In some embodiments, one or more of the steps of the method 1200 are carried out by the packet classifier module of an APSM (e.g., the packet classifier module 450). The steps of the method 1200 are described with reference to FIGS. 10-11 and may be carried out as part of step 606 of FIG. 6 in the case of generating forward traffic path information, or as part of step 907 of FIG. 9 in the case of generating (e.g., as compared to learning) return traffic path information.

At step 1201, a set of network services associated with a packet received by an APSM is identified (e.g., by the packet classifier module) using the local flow policy table of that APSM. The first generated forward/return traffic path information includes identifiers of NF types which are grouped in a set to form logical network service function chains (e.g., {Forward Traffic 1: DPI, Firewall, NAT, Analytics}). At step 1202, a network node (e.g., a particular instance of an NF) that which each network service (e.g., DPI, Firewall) is identified in the load balancing table (e.g., by the packet classifier module). For example, given the first generated forward traffic path information {Forward Traffic 1: DPI, Firewall, NAT, Analytics}, at step 1202 the packet classifier module produces identifiers for the following particular NF instances: {DPI: 210}, {Firewall: 1011a, 1011b . . . 1011n}, {NAT: 1012a, 1012b . . . 1012n}, and {Analytics: 1013a, 1013b . . . 1013n}. At step 1203, for each of the network services of the first generated traffic path information, a network node that provides that network service is selected. In some embodiments, the network node (e.g., a particular NF instance) is chosen by the packet classifier module from the load balancing table by a load balancer algorithm based on a past, current, or anticipated state of the network 400. Such states include overall load, packet latency, quality of service (QoS), or another state. In other embodiments, the particular NF instance is chosen by the packet classifier module using the load balancing table based on a probabilistic algorithm which weights particular NF instances based on a criteria such as current traffic load of that NF, total traffic load capacity of that NF, operator preferences, or other criteria and then selects a particular NF instance according to the weight associated with that NF. In still other embodiment, operator defined criteria is used by the packet classifier module to select particular NF instances from the load balancing table.

At step 1204, the forward traffic path information is generated using the set of network services and corresponding selected network nodes. For example, given the example first generated forward traffic path information {Forward Traffic 1: DPI, Firewall, NAT, Analytics}, and example identified NF instances {DPI: 210}, {Firewall: 1011a, 1011b . . . 1011n}, {NAT: 1012a, 1012b . . . 1012n}, {Analytics: 1013a, 1013b . . . 1013n}, an example of the generated forward traffic path information is {Forward Traffic 1: DPI NF 210, Firewall NF 1011a, NAT NF 1012a, Analytics NF 1013a}.

Figure 13:
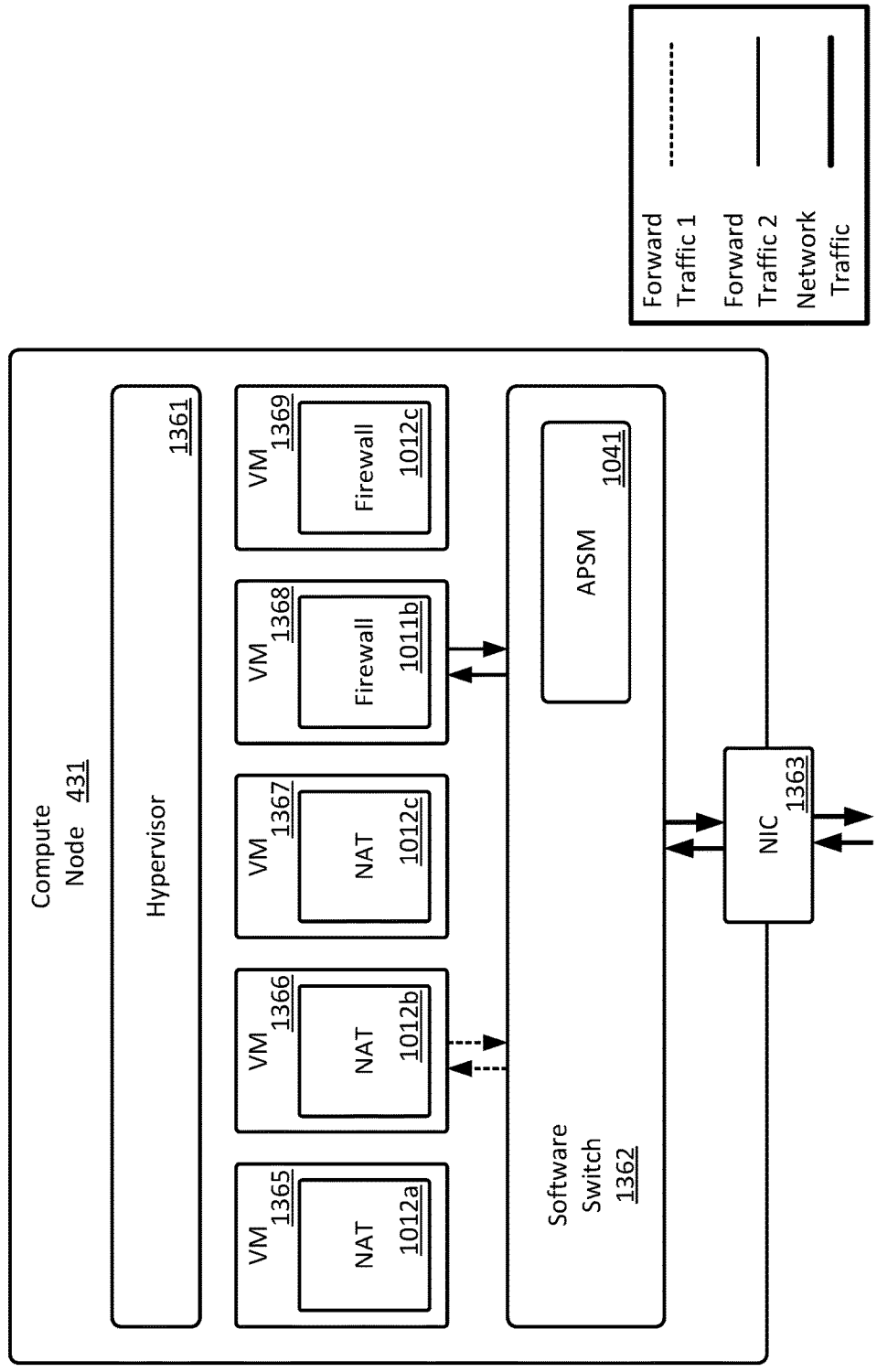
FIG. 13 illustrates an example network service architecture of a network for bidirectional anticipatory packet steering, in accordance with some embodiments.

FIG. 13 illustrates a simplified realization of the compute node 431 of the network 400, in accordance with some embodiments. Some modules or elements understood to be present at the compute node 231 have been omitted for simplicity. Other compute nodes of the network 400 may be implemented the same or similarly to the compute node 231. The compute node 231 generally includes a hypervisor module 1361 for provisioning, deleting, monitoring and managing one or more virtual machines (VMs) 1365-1369. In some embodiments, the VMs 1365-1369 are instead containers. The compute node 231 also includes a software switch module (sometimes also referred to as a vSwitch) 1362 which routes packets between a NIC 1363 of the compute node 231 and the VMs 1365-1369. In the embodiment shown, the APSM 1041 described with reference to FIG. 10 is communicatively coupled to the software switch 1362. Thus, routing decisions and behavior as realized by the software switch 1362 are at least in part determined by the APSM 1041. In some embodiments, the software switch 1362 includes the APSM 1041 as part of, or as a module, of the software switch 1362. In other embodiments, the APSM 1041 is external to the software switch 1362, the software switch 1362 being configured to exchange data and/or packets with the APSM 1041. In yet other embodiments, the NIC 1363 is a programmable NIC, and the APSM 1041 is included as part of the NIC 1363. In still yet other embodiments, the APSM 1041 is included as part of another network interface device.

In the example shown, Network Traffic is received at the NIC 1363 and communicated to the software switch 1362 and to the APSM 1041 (which is communicatively coupled to the software switch 1362). The received Network Traffic includes packets of two packet flows: Forward Traffic 1, and Forward Traffic 2. Using the APSM 1041, packets of Forward Traffic 1 are routed to the VM 1365 within which the NAT NF 1012a is provisioned. Also using the APSM 1041, packets of Forward Traffic 2 are routed to the VM 1368 within which the firewall NF 1011b is provisioned.

In some embodiments, one or more of the APSMs described herein are implemented as a separate software component that is co-located but decoupled from the code of the NF. In some embodiments, one or more of the APSMs described herein are implemented within a host operating system. In some embodiments, one or more of the APSMs described herein are implemented within a host hypervisor. In some embodiments, one or more of the APSMs described herein are implemented within the NF code itself. In some embodiments, one or more of the APSMs described herein are implemented within software that runs on a specialized compute node such as an FPGA, ASIC or GPU.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method comprising:
   receiving, by a first packet steering module of a network, a first encapsulated packet traveling in a forward traffic direction, the first encapsulated packet comprising a first encapsulating data structure, the network comprising a plurality of packet steering modules and a plurality of network nodes, the first packet steering module being one of the plurality of packet steering modules, each of the packet steering modules comprising a packet classifier module, a return path learning module, a flow policy table, and a replicated data structure (RDS);

generating, by the return path learning module of the first packet steering module, return traffic path information associated with the first encapsulated packet and based on the first encapsulating data structure;

updating, by the first packet steering module, the RDS at the first packet steering module using the return traffic path information; and transmitting, by the first packet steering module, the return traffic path information to one or more other packet steering modules of the plurality of packet steering modules.

2. The method of claim 1, wherein:
the first encapsulating data structure comprises a first set of identifiers identifying each of the network nodes that the first encapsulated packet traversed in the forward traffic direction; and
the return traffic path information comprises the first set of identifiers.

3. The method of claim 1, further comprising:
receiving, by a second packet steering module of the network, a packet traveling in the forward traffic direction;
determining, by the packet classifier module of the second packet steering module, that forward traffic path information associated with the packet is not stored in the RDS at the second packet steering module;
generating, by the packet classifier module of the second packet steering module, forward traffic path information associated with the packet using the flow policy table at the second packet steering module;
updating, by the second packet steering module, the RDS at the second packet steering module using the forward traffic path information; and
transmitting, by the second packet steering module, the forward traffic path information to one or more other packet steering modules of the plurality of packet steering modules.

4. The method of claim 3, wherein:
the forward traffic path information comprises a second set of identifiers identifying each of the network nodes that the packet shall traverse.

5. The method of claim 3, further comprising:
generating, by the second packet steering module, a second encapsulating data structure based on the forward traffic path information;
generating, by the second packet steering module, a second encapsulated packet by encapsulating the packet with the second encapsulating data structure; and
forwarding, by the second packet steering module, the second encapsulated packet from the second packet steering module to a first network node of the plurality of network nodes identified by the forward traffic path information.

6. The method of claim 5, wherein:
the first packet steering module received the first encapsulated packet from a second network node of the plurality of network nodes;
the first network node is an initial network service node of a network service chain; and
the second network node is a final network service node of the network service chain.

7. The method of claim 6, wherein:
the first network node is stateful; and
the second network node is not stateful.

8. The method of claim 6, wherein:
the first packet steering module and the second packet steering module are the same packet steering module.

9. The method of claim 3, wherein:
each network node of the plurality of network nodes provides at least one type of network service of one or more types of network services;
the flow policy table comprises one or more sets of network service identifiers, each of the network service identifiers identifying one of the types of network services; and
each packet steering module of the plurality of packet steering modules comprises a load balancing table, each of the load balancing tables comprising one or more sets of network service instance identifiers, each network service instance identifier identifying a network node and the network service identifier for a network service provided by that network node.

10. The method of claim 9, wherein generating the forward traffic path information associated with the packet comprises:
retrieving, by the packet classifier module of the second packet steering module, one of the sets of network service identifiers based on the packet using the flow policy table at the second packet steering module;
determining, by the packet classifier module of the second packet steering module, one of the sets of network service instance identifiers based on the retrieved set of network service identifiers using the load balancing table at the second packet steering module; and
generating, by the packet classifier module of the second packet steering module, the forward traffic path information using the determined set of network service instance identifiers.

11. The method of claim 10, wherein determining one of the sets of network service instance identifiers comprises:
determining, by the packet classifier module of the second packet steering module, a set of network service instances for each network service identifier of the retrieved set of network service identifiers; and
choosing, by the packet classifier module of the second packet steering module, a particular network service instance from the set of network service instances based on one or more of a previously defined policy or a current operating state of the network.

12. The method of claim 3, wherein:
the plurality of network nodes is provisioned on a set of one or more compute nodes of the network; and
at least one of the packet steering modules of the plurality of packet steering modules is provisioned on each of the one or more compute nodes.

13. The method of claim 12, wherein:
at least one of the packet steering modules is provisioned within a virtual switch on one of the one or more compute nodes.

14. The method of claim 3, wherein:
at least one of the network nodes is provisioned in a virtual machine.

15. The method of claim 3, wherein:
at least one of the network nodes is provisioned in a container.

16. The method of claim 3, wherein:

at least one of the network nodes is a network service node that provides a network service to bidirectional network traffic.

17. The method of claim 1, further comprising:

receiving, by a second packet steering module of the network, a packet traveling in the forward traffic direction;

determining, by the packet classifier module of the second packet steering module, that forward traffic path information associated with the packet is stored in the RDS at the second packet steering module;

generating, by the packet classifier module of the second packet steering module, forward traffic path information associated with the packet using the RDS at the second packet steering module;

generating, by the second packet steering module, a second encapsulating data structure based on the forward traffic path information;

generating, by the second packet steering module, a second encapsulated packet by encapsulating the packet with the second encapsulating data structure; and forwarding, by the second packet steering module, the second encapsulated packet from the second packet steering module to a network node identified by the forward traffic path information.

18. The method of claim 1, further comprising:

receiving, by a second packet steering module of the network, a packet traveling in a return traffic direction;

determining, by the packet classifier module of the second packet steering module, that return traffic path information associated with the packet is stored in the RDS at the second packet steering module;

generating, by the packet classifier module of the second packet steering module, return traffic path information associated with the packet using the RDS at the second packet steering module;

generating, by the second packet steering module, a second encapsulating data structure based on the return traffic path information;

generating, by the second packet steering module, a second encapsulated packet by encapsulating the packet with the second encapsulating data structure; and forwarding, by the second packet steering module, the second encapsulated packet from the second packet steering module to a network node identified by the return traffic path information.

19. The method of claim 18, wherein:

the packet is of a packet flow, the packet flow comprising a plurality of packets; and a previous packet of the packet flow previously traversed the network node identified by the return traffic path information.

20. The method of claim 1, wherein:

the return traffic path information transmitted by the first packet steering module is transmitted peer-to-peer to the one or more other packet steering modules of the plurality of packet steering modules.

21. The method of claim 19, wherein:

the return traffic path information is transmitted peer-to-peer to the one or more other packet steering modules of the plurality of packet steering modules using a gossip protocol.

22. The method of claim 20, wherein:

upon receiving the return traffic path information at a third packet steering module of the one or more other packet steering modules, the third packet steering module updates the RDS at the third packet steering module to contain a same data as is stored in the RDS at the first packet steering module.

23. A method comprising:

receiving, by a first packet steering module at a first compute node of a network, a first encapsulated packet of a first network packet flow, the first encapsulated packet being received from a first network function at the first compute node, the first encapsulated packet traveling in a forward network traffic direction from the first network function;

generating, by the first packet steering module, return traffic path information associated with the first encapsulated packet, the return traffic path information comprising one or more indicators indicating one or more network functions of the network; and transmitting peer-to-peer, by the first packet steering module, the return traffic path information to a second packet steering module of a second compute node of the network, the second compute node comprising a plurality of network functions, the second packet steering module being configured to forward packets of a second network packet flow to a second network function at the second compute node.

24. The method of claim 23, wherein:

the second packet steering module is configured to not forward any packets of the first network packet flow to the second network function.

* * * * *